(12) United States Patent
Witt et al.

(10) Patent No.: US 12,067,464 B2
(45) Date of Patent: Aug. 20, 2024

(54) METHOD OF PERFORMING A PROCESS USING ARTIFICIAL INTELLIGENCE

(71) Applicant: TeamViewer Germany GmbH, Göppingen (DE)

(72) Inventors: Hendrik Witt, Bremen (DE); Oliver Gruhlke, Bremen (DE); Amjad Yassin, Bremen (DE); Kai Zimmermann, Bremen (DE)

(73) Assignee: Team Viewer Germany GmbH, Goppingen (DE)

( * ) Notice: Subject to any disclaimer, the term of this patent is extended or adjusted under 35 U.S.C. 154(b) by 939 days.

(21) Appl. No.: 17/104,208

(22) Filed: Nov. 25, 2020

(65) Prior Publication Data
US 2021/0158214 A1   May 27, 2021

(30) Foreign Application Priority Data

Nov. 27, 2019 (EP) .................................. 19211785

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
CPC . G06N 20/00; G06N 5/04; G06N 3/08; G06F 16/215
See application file for complete search history.

(56) References Cited

U.S. PATENT DOCUMENTS

| 7,958,066 B2 | 6/2011 | Pinckney et al. |
| 9,443,153 B1 | 9/2016 | Gupta et al. |

(Continued)

FOREIGN PATENT DOCUMENTS

| WO | 2013003957 A1 | 1/2013 |
| WO | 2018213205 A1 | 11/2018 |

OTHER PUBLICATIONS

European Search Report issued in EP19211785 (19211785.1), dated May 18, 2020 (9 pages).

(Continued)

*Primary Examiner* — Dave Misir
(74) *Attorney, Agent, or Firm* — ARC IP Law, PC; Joseph J. Mayo

(57) ABSTRACT

The invention relates to a method of performing a process using artificial intelligence. The method comprises running, by a computing device, an application configured to perform a process which uses an artificial intelligence model for processing signals and defining at least one parameter set for performing the at least one process; running, by the computing device, a user-driven workflow engine which comprises multiple modules including at least a first and second module; defining, by the first module, a context of the process and generating corresponding context information, providing the artificial intelligence model based on the generated context information of the process; and using, by the second module, the artificial intelligence model in a user-driven workflow within the application while executing the process. Advantageously, the combination of these modules describes an end-to-end connection which is self-learning and self-improving and is targeted at users with no expertise in the AI domain.

13 Claims, 3 Drawing Sheets

(56) References Cited

U.S. PATENT DOCUMENTS

| | | | |
|---|---|---|---|
| 2005/0027664 A1 | 2/2005 | Johnson et al. | |
| 2010/0076923 A1 | 3/2010 | Hua et al. | |
| 2011/0307542 A1 | 12/2011 | Wang et al. | |
| 2014/0181089 A1 | 6/2014 | Desmond et al. | |
| 2015/0242760 A1 | 8/2015 | Miao et al. | |
| 2017/0017903 A1 | 1/2017 | Gray et al. | |
| 2018/0165604 A1* | 6/2018 | Minkin | G06Q 10/06 |
| 2018/0314738 A1 | 11/2018 | Stefik et al. | |
| 2019/0076731 A1* | 3/2019 | Hickman | G06V 10/774 |
| 2019/0138946 A1* | 5/2019 | Asher | G06N 5/02 |
| 2019/0188538 A1 | 6/2019 | Kwant et al. | |
| 2020/0057964 A1* | 2/2020 | Howard | G06N 20/10 |
| 2020/0202171 A1* | 6/2020 | Hughes | G06F 18/214 |

OTHER PUBLICATIONS

European Search Report issued in EP211789 (19211789.3), dated May 14, 2020 (9 pages).

\* cited by examiner

METHOD OF PERFORMING A PROCESS USING ARTIFICIAL INTELLIGENCE

This application claims foreign priority to European Patent Application No. 19211785.1, filed 27 Nov. 2019, the specification of which is hereby incorporated herein by reference.

BACKGROUND OF THE INVENTION

Field of the Invention

The present invention relates to a method of performing a process which runs an application which implements artificial intelligence with an artificial intelligence model to be trained, and to a computer program product comprising software code sections which are adapted to perform such method.

Description of the Related Art

Generally, so-called Artificial Intelligence is often used as a term which encompasses various forms of algorithms which are also known as Machine Learning or Deep Learning. It may involve various algorithms that can automatically learn from experience. Typically, such algorithms are built on mathematics and statistics that can be employed to predict events, classify entities, diagnose problems, and model function approximations, just to name some examples.

Artificial Intelligence (AI) is, among other, useful for validating actions in complex processes. For example, objects, environments, actions, gestures and other general features (such as visual, numerical, acoustical, etc.) can be detected by using sensors and then interpreted by using AI. The results of this interpretation are then, for example, used to ensure quality, safety and a high productivity in complex processes.

To make use of, for example, AI assisted interpretation, it is useful to have it during the early stages of creating these processes, and especially in the modeling stage. Nowadays, there are multiple process modeling tools in the market, which can be used by technically untrained or unexperienced users with no special technical expertise. However, using existing AI solutions, and especially integrating the results into existing processes, typically requires domain knowledge and expert skills. Nontechnical users with no special knowledge are normally not able to use and/or integrate AI solutions into the processes when necessary. Issues start with a lack of guidelines on, e.g., which data to collect, how to interpret any results and how to improve the results. Moreover, such tools with AI capabilities do not provide a solution to directly deploy results in the required context, therefore, the users must rely on additional tools or acquire additional knowledge to use them. That is why AI-capable process modeling tools are mostly implemented by methodical experts.

US 2015/0242760 A1 refers to machine learning which may be personalized to individual users of computing devices, and can be used to increase machine learning prediction accuracy and speed, and/or reduce memory footprint. Personalizing machine learning can include hosting, by a computing device, a consensus machine learning model and collecting information, locally by the computing device, associated with an application executed by the client device. Personalizing machine learning can also include modifying the consensus machine learning model accessible by the application based, at least in part, on the information collected locally by the client device. Modifying the consensus machine learning model can generate a personalized machine learning model. Personalizing machine learning can also include transmitting the personalized machine learning model to a server that updates the consensus machine learning model.

U.S. Pat. No. 9,443,153 B1 discloses a yield determination system for automatically collecting, determining, and labeling yield behaviors of vehicles during cooperative driving scenarios. The system includes sensors for detecting the start and stop of the scenario, a data recorder for automatically collecting the data, an annotation unit for automatically labeling features of interest about the vehicle and surrounding vehicles during the scenario. The labeled file may be automatically uploaded and processed to insert the labelled features into a learning model to predict vehicle behavior in cooperative driving scenarios.

US 2010/0076923 A1 refers to an online multi-label active annotation which may include building a preliminary classifier from a pre-labeled training set included with an initial batch of annotated data samples, and selecting a first batch of sample-label pairs from the initial batch of annotated data samples. The sample-label pairs may be selected by using a sample-label pair selection module. The first batch of sample-label pairs may be provided to online participants to manually annotate the first batch of sample-label pairs based on the preliminary classifier. The preliminary classifier may be updated to form a first updated classifier based on an outcome of the providing the first batch of sample-label pairs to the online participants.

It would therefore be beneficial to provide a method of performing a process which uses artificial intelligence, which method is adapted such that users who are using the process in an application which implements AI do not necessarily need AI-specific knowledge or the ability to use tools that rely on AI-specific solutions.

BRIEF SUMMARY OF THE INVENTION

According to an aspect, there is provided a method of performing a process which uses artificial intelligence, wherein the method comprises:
  running, by a computing device, an application which is configured to perform at least one process which uses an artificial intelligence model for processing signals and defining at least one parameter set for performing the at least one process,
  running, by the computing device, a user-driven workflow engine which comprises multiple modules including at least a first and second module,
  defining, by the first module, a context of the at least one process and generating corresponding context information,
  providing the artificial intelligence model based on the generated context information of the at least one process, and
  using, by the second module, the artificial intelligence model in a user-driven workflow within the application while executing the at least one process.

According to another aspect, there is provided a computer program product comprising software code sections that, when loaded into an internal memory of a computing device, cause the computing device to perform a method according to aspects of the invention as described herein. For example, the computer program product is, or is part of, a computer readable medium comprising such software code sections.

The computer program product, or computer readable medium, respectively, in principle can be, or can be stored on, any computer code storage medium accessible by commonly known processing devices, such as network computers or servers, microprocessors, e.g. volatile or non-volatile memories, e.g. movable, wearable, or hard-disks, or memories on a remote server, to name potential examples.

Advantageously, the method according to aspects of the invention can be implemented in, or forms part of, a so-called end-to-end system that enables users with no special technical or domain knowledge to create and use an AI-capable solution to optimize their processes. The method according to aspects of the invention preferably comprises an automatic or workflow-aided interpretation of the process's context, generation of labeled data collection workflows, creation of self-improving AI models, and integration with the process's workflow.

According to further aspects of the invention, the method comprises selecting the artificial intelligence model based on the generated context information of the at least one process and providing the artificial intelligence model to the second module, or the user-driven workflow engine further comprises a third and fourth module, wherein the method further comprises executing, by the third module, a data collection workflow, wherein the third module, when executing the data collection workflow, requests user input and guides the user through a user-driven data collection procedure of collecting labeled data and creates a dataset of labeled data as a basis for the at least one process, and creating and training, by the fourth module, the artificial intelligence model based on the dataset of labeled data and the generated context information of the at least one process and providing the artificial intelligence model by the fourth module to the second module.

According to an embodiment, the artificial intelligence model is provided based on the generated context information such that the context information is analyzed with respect to multiple AI models provided from one or more databases and one of the AI models is selected based on the generated context information and provided to the second module. In this way, when there is already a "matching" AI model in a database which is appropriate for solving the problem concerned with the created AI project, the process may not need to perform a data collection workflow and training of an AI model completely or partially.

According to an embodiment of the invention, the at least one process receives signals from at least one sensor and one or more sensor-driven components and implements the artificial intelligence model for processing the signals received from the at least one sensor and sensor-driven component. For example, the at least one sensor may be one or more cameras for capturing images and/or video streams of a real environment, and the sensor-driven component may be a processor or other processing unit for controlling the sensor reading, e.g. image/video capturing process, and transfer to a computer device or network. In such embodiment, the artificial intelligence model may be employed in a computer vision process in which the image and/or video streams are processed. Other sensors, such as for capturing or measuring physical parameters, like temperature, load, electrical voltage, or light, or IMU (inertial measurement unit) sensors, etc., and corresponding sensor-driven components for processing and/or transmitting such sampled physical parameters may also be employed individually, or in any combination with each other, in connection with the present invention. Further, any sensors or sensor types commonly used with, or integrated in, mobile devices or wearable devices can also be employed in connection with the invention, for example one or more audio sensors or IMU sensors.

According to an embodiment, the user-driven workflow by the second module implements a verification engine which is configured to verify one or more conditions by received user input while executing the at least one process. Advantageously, such verification engine allows a user to easily define his/her own verification step.

According to an embodiment, defining a context of the at least one process comprises at least one of: defining context information from received user input by the first module, and implicitly generating context information by the first module using information while executing the at least one process and/or information from at least one sensor. For example, context information may be explicitly defined by user input, or implicitly referred by using information from the user actions at a later stage.

According to an embodiment, defining context information from received user input comprises providing a wizard, by the first module, for receiving user input and defining the context information by the user input received.

According to a further embodiment, defining a context of the at least one process comprises at least one of: defining a context of a real environment in which the at least one process is applied, defining an environment condition of a real environment in which the at least one process is applied, defining a context of an object to which the at least one process is applied, defining one or more parameters of object perception by the at least one process.

According to an embodiment, executing, by the third module, the data collection workflow comprises executing a workflow driven by the third module to stepwise collect the labeled data by received user input. For example, the user will be asked step by step to gather the data in an easy and simple-to-understand manner to ensure the quality of the data.

According to an embodiment, in the data collection workflow executed by the third module the user is inquired to gather different types of data from a plurality of different types of data available to the third module. For example, the user will be asked step by step to gather the different types of data to ensure the quality of the data.

According to an embodiment, while executing the data collection workflow executed by the third module, collected data is automatically labeled and/or synchronized with a server computer. For example, while executing the workflow, the data may be automatically labeled and synchronized with a server computer to allow easier access to the data and collaboration.

According to an embodiment, training the artificial intelligence model is initiated, by the fourth module, when a predefined amount of labeled data has been collected. For example, as soon as a minimum amount of data is collected, the training of an AI model using the data can be started.

According to an embodiment, based on the context information of the at least one process, one of multiple different artificial intelligence technologies is selected and used by the fourth module to create the artificial intelligence model. For example, based on the context and using the collected and labeled data, the right AI technology will be used to create a model which can achieve the requested target of the process.

According to some embodiments, one or more artificial intelligence models are stored, e.g., in a database, can be searched and reused based on the generated context information. For example, when a user wants to create a new AI project and there is already a "matching" AI model which is appropriate for solving the user's problem in the database, the process does not need to perform the data collection workflow and training the AI model completely (or partially, depending on the circumstances in what manner, and how far the existing AI model can be used). Thus, the processes performed by the third and fourth modules are only optional in some instances.

According to an embodiment, at least one of defining the context of the at least one process and generating corresponding context information, executing the data collection workflow, and creating and training the artificial intelligence model includes at least one iterative loop with an iterative modification of at least one parameter while executing the at least one process. For example, at least parts of the process, or the whole process, is configured to iteratively improve automatically or with only few user input while executing the at least one process.

For example, executing the data collection workflow includes at least one of an iterative modification of the dataset quality and use of inference images in at least one iterative loop to increase the dataset. According to further embodiment, creating and training the artificial intelligence model includes using context for artificial intelligence model improvement. According to yet a further embodiment, creating and training the artificial intelligence model comprises providing a training result interface for the user providing information for evaluating results and working against weaknesses.

BRIEF DESCRIPTION OF THE DRAWINGS

Aspects of the invention and embodiments will now be described with reference to the following Figures in which.

DETAILED DESCRIPTION OF THE INVENTION

In the following exemplary description numerous specific details are set forth in order to provide a more thorough understanding of embodiments of the invention. It will be apparent, however, to an artisan of ordinary skill that embodiments of the invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
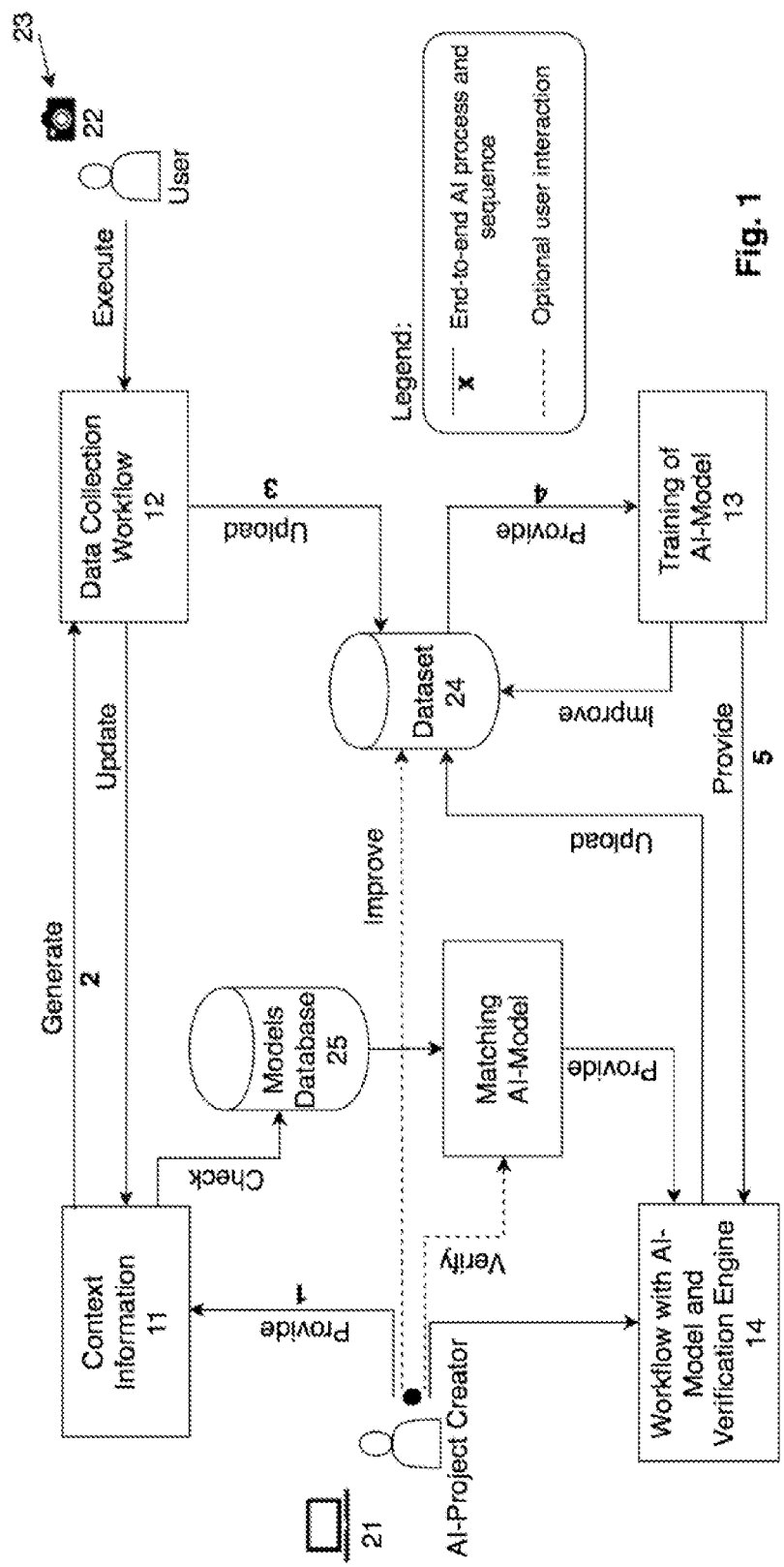
FIG. 1 depicts a schematic workflow diagram illustrating a method of performing a process using artificial intelligence according to an embodiment of the invention.
Figure 2:
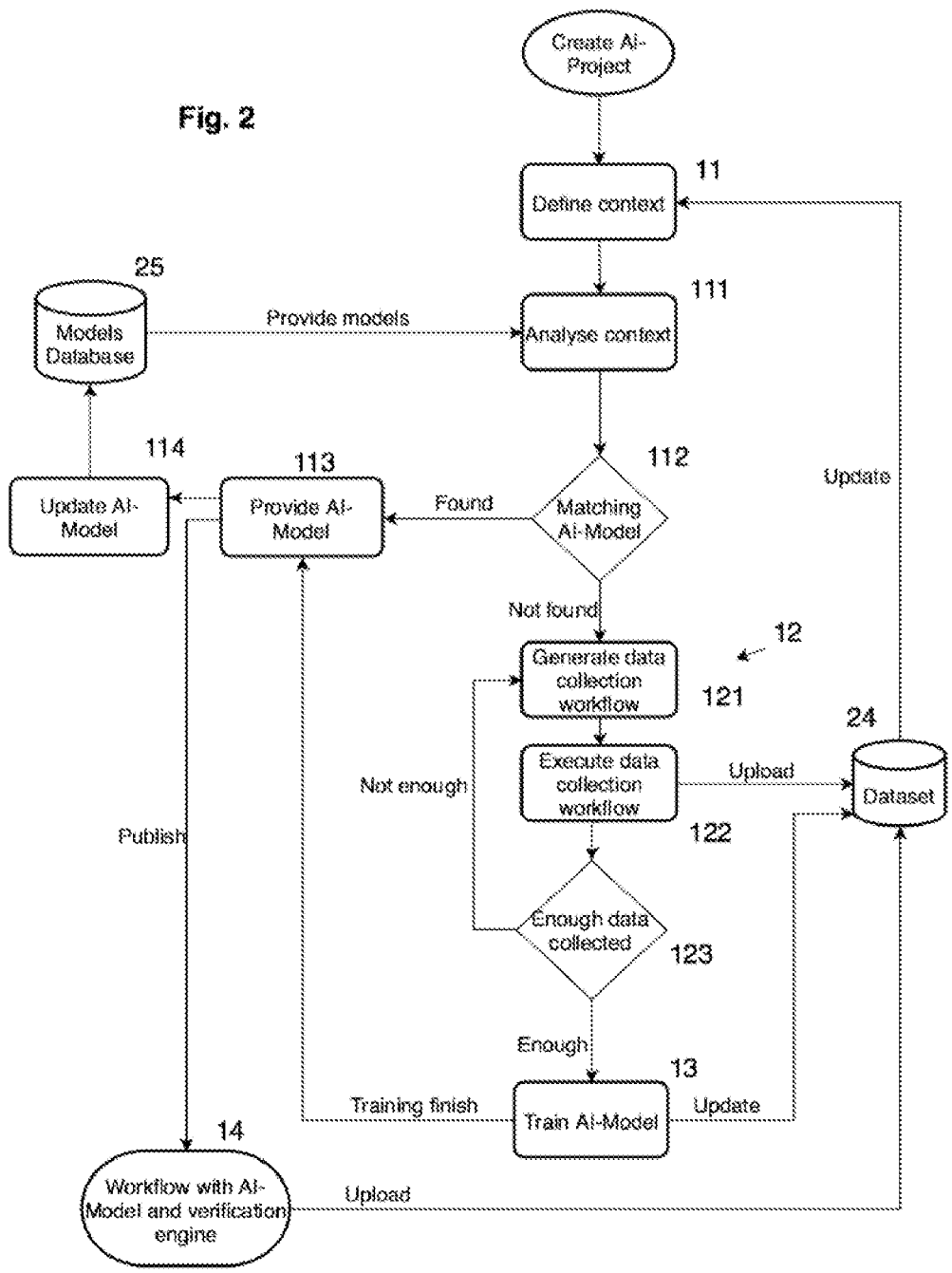
FIG. 2 depicts another workflow diagram illustrating a method of performing a process using artificial intelligence according to a further embodiment of the invention.

FIGS. 1 and 2 each show a schematic workflow diagram illustrating a method according to a respective embodiment of the invention. In a potential scenario, a user (for example, in FIG. 1 designated as "AI-Project Creator") uses a computing device 21, which may be in principle any commonly available computing device, e.g. a personal computer, tablet computer, wearable or mobile computing device, a server computer, etc.

The user may also employ one or more sensors for measuring or capturing one or more physical parameters, such as one or more cameras 22 for capturing images of a real environment, or any other type of sensor, and a sensor-driven component 23 (not explicitly shown), such as a processing device or other electronic component communicating with the sensor(s) for processing the measured parameters. For example, the sensor-driven component 23 is configured to communicate with the computing device 21 and sensor(s) in wired manner or wirelessly. For example, the sensor-driven component 23 may be implemented in the one or more sensors, e.g., may be a processing device implemented in the sensor, for example a camera processor implemented in the camera. The computing device 21 may be on site or remote (e.g., at a different location) from the sensor(s), in this embodiment from the at least one camera 22. It may be coupled with the sensor(s) and/or sensor-driven component in wired manner or wirelessly, for instance through the Internet.

For example, a server computer can be used, which can be a local machine or a so-called cloud server. Analogously, one or more sensors (e.g. cameras or IMU sensors) can be used which can be remote or assembled on the client device, like a mobile phone.

The following embodiments describe aspects of the invention mainly with respect to using a camera sensor for capturing images of a real environment. However, the invention may also be applied in connection with other sensors, like an IMU sensor integrated in a wearable device, applied individually or in combination with, e.g., a camera, and corresponding sensor data collected, provided and processed in modules 11 to 14 accordingly.

The computing device 21, which may comprise one or more microprocessors as commonly used in data processing devices like server computers or personal computers, receives the captured parameters from the one or more sensors, here images from the camera(s) 22. For example, the computing device 21 may be a wearable device and may include one or more microprocessors as a sensor-driven component 23 and the one or more cameras 22.

In a potential implementation, the computing device 21 and/or sensor-driven component 23 may be implemented in software and/or hardware, in discrete or distributed manner, in any appropriate processing device, such as in one or more microprocessors of a local device, e.g. of a mobile or wearable computer system, and/or of one or more server computers.

The workflow of the method according to the embodiment illustrated in FIG. 1 is a so-called end-to-end system, that enables users with no special technical or domain knowledge to create and use an AI-capable solution to optimize their processes. The solution according to the present embodiment comprises an automatic interpretation of the process's context, generation of labeled data collection workflows, creation of self-improving AI models, and integration with the process's workflow.

Generally, the user runs on the computing device 21 an application, such as a computer vision application, which is configured to perform at least one process which uses an artificial intelligence model for processing signals and defining at least one parameter set for performing the at least one process. For example, the application is a computer vision application which performs an image or object recognition process on images of a real environment captured by the camera 22 and which uses an artificial intelligence model for processing signals related to or derived from the images and for defining at least one parameter set used in an image processing algorithm having a machine learning architecture. For example, the algorithm is configured according to one or more sets of parameters provided from a multi-layer neural network as commonly known in connection with machine learning architectures.

Artificial Intelligence (AI) is used herein as a term which also implies Machine Learning, Computer Vision, Deep Learning, etc. It is used as a term which describes all the different forms of algorithms which are based on machine learning. This could be Image Classification, Object Detection, or other ways of interpreting sensor, task and/or process data.

An AI model is understood as being a model ready to be used by an AI algorithm.

Context or context information is used herein as a collection of information which is indicative of the situation, use case, environment and/or intention associated with the process using AI in order to create the correct machine learning based solution.

The term dataset used herein combines raw data with labels and context information for each datum. More particularly, a label describes machine readable information about a datum, e.g. used for training a machine learning solution.

The term workflow describes a formal representation of a process which can be understood by software, so that the user can be guided through the process or it could be executed automatically.

Labeled data refers to data which has a configuration such that it can be used for generating AI based processes (also called modules when implemented in an overall process) or components of such processes. Particularly, labeled data comprises data and a label which describes machine readable information about the data, e.g. used for training a machine learning solution. Typically, labeled data comprises data captured by one or more sensors and a description (label) of the captured data, e.g. so-called ground truth, in a format which can be further processed by a machine.

In the workflow of FIG. 1, the computing device 21 runs a user-driven workflow engine which comprises multiple modules, wherein the module may comprise hardware and/or software as previously described with respect to computing device 21, i.e., software and/or hardware, in discrete or distributed manner, in any appropriate processing device, etc. In a first module 11, a context of the at least one process is defined and corresponding context information is generated.

A third module 12 executes a data collection workflow, wherein the third module, when executing the data collection workflow, requests user input and guides the user through a user-driven data collection procedure of collecting labeled data and creates a dataset of labeled data as a basis for the at least one process, e.g. object recognition process. A fourth module 13 creates and trains the artificial intelligence model based on the dataset of labeled data and the generated context information of the at least one process. Finally, a second module 14 uses the trained artificial intelligence model in a user-driven workflow within the application while executing the at least one process.

As described above, the processes performed by the third and fourth modules 12, 13 are only optional in some instances, for example in a case when one or more artificial intelligence models are stored, e.g., in a database, which can be searched and reused based on the generated context information. For example, when a user wants to create a new AI project and there is already a "matching" AI model in the database which is appropriate for solving the user's problem, the process does not need to perform the data collection workflow and training the AI model completely or partially.

Accordingly, some embodiments of the method comprise basically two, optionally four parts, sub-processes, or modules 11-14, which are performed subsequently or step-by-step, as follows: defining the context (11), data collection (12) (optional), creation of the AI model (13) (optional), including automatic improvements, and using the newly created AI model in a workflow (14).

Details of embodiments of the respective process steps from one of the modules to another one of the modules 11-14, designated with reference numerals 1 through 5, will be described below with reference to FIGS. 1 and 2:

Defining the context (11):

A first module of a method according to embodiments of the invention comprises defining the context of the process. A well-defined context is beneficial for an automatic generation of a data collection workflow and to keep the required amount of data relatively small. In addition, it can be used for automatic improvement of the AI model. Context information may be explicitly defined by user input 1, or implicitly referred by using information from one or more user actions at a later stage.

With reference to the embodiment of FIG. 2, following the definition of the context with the module 11, the generated context information is analyzed. Particularly, in a step 111 the context information is analyzed with respect to AI models searched in and provided from, e.g., a database 25. In a case in which one or more AI models are already existing, such AI model can be selected based on the generated context information and (re)used. For example, when there is already a "matching" AI model in the database 25 (step 112) which is appropriate for solving the problem concerned with the created AI project, the process may not need to perform a data collection workflow and training of an AI model completely or partially. In case an existing AI model is found, the process proceeds to step 113 for providing the AI model to the module 14. Optionally, the AI model can be updated, e.g. based on the generated context information, in a step 114 and provided back to the database 25 for storing the updated AI model therein.

Data collection (12):

The data collection module 12 may be processed in a case in which an appropriate AI model is not found in database 25, or in a case in which there is no database available storing any previous AI models which may be (re)used. In the present embodiment, the module 12 is configured to perform the steps 121 to 123 in a recursive loop as shown in FIG. 2. Based on context information defined in the first module 11, embodiments of the method automatically create a workflow to collect labeled data (step 121). Particularly, labeled data describes machine readable information about a datum, e.g. used for training a machine learning solution. This workflow is focused on gathering the data which is processed by the following parts or modules of the method. Any user who executes this workflow will be guided through the data collection process in order to collect meaningful and context appropriate data. Particularly, step by step, the user will be asked to gather different types of data in an easy and simple to understand manner to ensure the quality of the data. While executing the data collection workflow in step 122, the data may be automatically labeled and synchronized with (i.e. uploaded to) a remote server computer 24 storing a dataset (e.g. via the Internet) to allow easier access to the data and collaboration. Moreover, additional workflows can be generated to address any gaps or deficiency of the collected data. In step 123, it is decided whether a minimum amount of data is collected, and if not, the process returns to steps 121 and 122 for performing the workflow to collect further data.

Creation and Training of the AI model (13):

Preferably as soon as a minimum amount of data is collected, the creation and training of the AI model using the data can be started. Based on the context information and using the collected and labeled data, the right AI technology will be used to create a model which can achieve the requested target of the process. The training part automatically improves the solution over time when the model is used and may also update the dataset of previously collected data stored on server computer 24. In addition, it is possible that different technologies are automatically tested and evaluated against each other. When the training is finished, the AI model is provided by the module 13 to the module 14.

Use of a (newly created) AI model in a workflow (14):

The newly created and trained AI model provided from module 13, or the AI model provided via the database 25, respectively, can now be used in a workflow performed by module 14. The solution provides a way to configure it to the needs of the process. The use of the AI model preferably contains a verification engine which allows a user to easily define his or her own verification step. The verification engine uses an own describing language to define conditions for each step on his own. Within this engine multiple conditions can be combined to develop even more complex verifications.

The combination of these four parts or modules 11 to 14, or of modules 11 and 14 in case an AI model is provided without the data collection workflow and training of an AI model performed in modules 12 and 13, respectively, describes an end-to-end connection. Advantageously, the method according to the invention is self-learning and self-improving and is targeted at users with no expertise in the AI domain.

In the following, a potential example of use of aspects of the present invention will be described. It will be appreciated by the skilled person that the invention may also be applied in connection with other use scenarios, and that the following description of embodiments may not be understood as limiting the invention in this respect.

In the following example, in which an inspection workflow shall be performed where a worker has to inspect a gas pipeline flange for corrosion manually using specific cameras and/or measurement tools, the search for corrosion should be improved by AI. Furthermore, the head posture of the worker should be observed to prevent health issues. The worker should not turn his head too far up or down for a long time. The present example thus processes multiple sensor data, particularly of different types of sensors, here of an image sensor and an IMU sensor.

According to an embodiment, the worker, in the following also called user, or the project owner (which may be the same or a different person) creates a new AI project on the computing device 21. For example, the computing device is a mobile computer, such as a laptop or tablet computer, which can be used on-site. The user starts on the computing device an application, e.g. a pipeline corrosion inspection application, which performs at least one process for performing the corrosion inspection and providing corresponding results in which one or more artificial intelligence algorithms and models are used.

To this end, the user runs a user-driven workflow engine on the computing device and starts with performing the first module 11 in which the user provides context information which fits the corrosion inspection process. The worker will normally start the inspection process with inspecting the pipeline, the flange and rusted parts. The head posture should always be straight while inspecting. Therefore, the created AI model should be able to detect all these objects and observe the head position within the specified context by sampling data of one or more movement sensors. The inspection is, e.g., done outside, from different perspectives, in sunny or cloudy light conditions. Preferably, all information is collected from a wizard or inferred from user selections and/or collected data at a later stage. Finally, the user may select a team for the data collection.

In a next step, the worker executes an automatically generated data collection workflow within module 12 with the computing device 21 in the working environment. The workflow guides the worker through the data collection process and provides instructions on what and how the worker or workers should collect the data. It follows a step by step guide, where the worker is asked to take one or more images of objects to be inspected defined by the project owner in each requested context. While taking these pictures the user has to carefully match a head posture which prevents health issues. If the worker is not able to create the requested conditions, he or she can also skip a step. In the example, the worker takes images on a sunny day, so he or she should skip every step which requests images on a cloudy day. As soon as the worker finishes the data collection, the images are labeled and uploaded to the corresponding project on the server computer 24. For example, the image may be labeled instantly when its captured (i.e., labeling as soon as a datum is collected). In another option, the image may be labeled when the data collection is finished. Both options, and any further potential options, are possible.

The same is done to the collected data of the movement sensors. The continuous data is stored and labeled as a correct head position. The whole workflow within module 12 could be repeated multiple times to add more images or reach all conditions.

The project owner may now check the images and movement data collected by the worker and may improve the automatically generated labeling when necessary. Also, he or she may upload some images or movement data from previous inspections and label them on his or her own. These steps are optional and can also be skipped.

Subsequently, the project owner starts a training within the module 13. In order to do this, he or she provides some additional information specific to the project and the defined context and clicks on the start button. The complete dataset as well as the information needed for training is now automatically sent from the server computer 24 to a training machine, e.g. running on the computing device 21. For the first time, a potential optimal AI approach and parameters of a parameter set used in the machine learning algorithm are defined based on the dataset and context. While training the project owner is constantly updated on the training status. As soon as the training is finished, the owner can check the results of the AI model.

Figure 3:
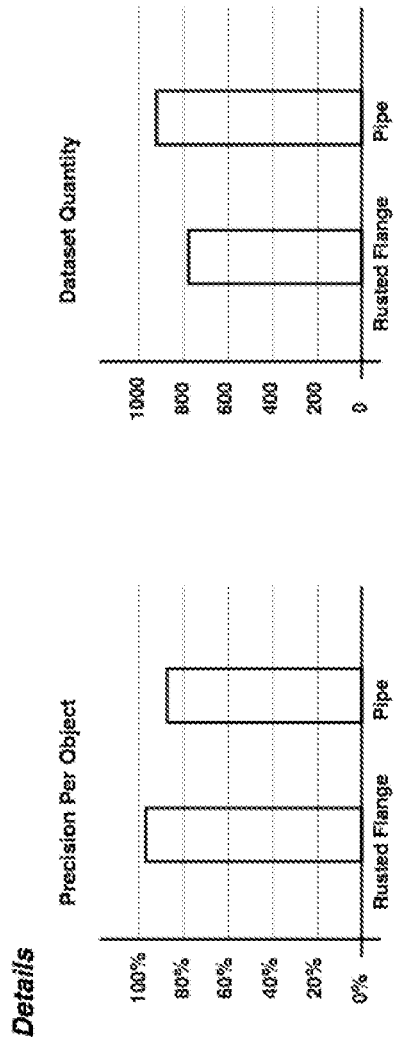
FIG. 3 shows a schematic illustration of an example of a training result interface provided to the user which depicts information for evaluating results and working against weaknesses.
Figure 3:
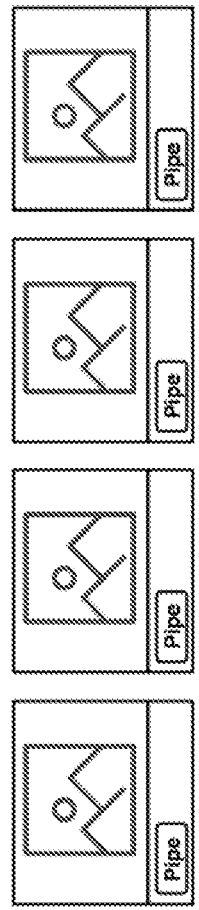

FIG. 3 shows a schematic illustration of an example of the image part of a training result interface provided to the user or project owner which depicts information for evaluating results of the inspection process and working against weaknesses. In the results page, the owner observes, for example, that the overall performance of the AI model is quite good, but it has issues detecting the flange correctly. In an overview of bad predicted images (see FIG. 3, on the bottom), he or she may see that a strong reflection causes an issue detecting the flange.

As a result, the owner or worker can try to improve the dataset even more by following any solutions suggested on-screen. However, as the overall performance is good, and the focus is on detecting the corrosion, the owner may decide to use the model as is. Thus, the owner publishes the AI model to make it available for the workflow editor.

Next, the worker or owner edits the inspection workflow and adds an AI step, e.g., via drag and drop. The step is then configured to show a warning when a rusted part is detected and a reminder when the head is in a wrong position for longer than 30 seconds. A user of the inspection workflow now gets a visual warning when there is corrosion while inspecting the flange. When the user has a bad head position while inspecting he gets a warning to do the inspection in a healthier position. Based on the latest results of the inspection workflow, the training setup is changed to get better results.

While executing the AI empowered inspection workflow, the dataset may be continuously improved by adding more images. To use these new images in the training, only a simple user interaction is needed. In this example, the project owner accepts images from a sunny inspection day to improve the quality of detections with strong reflections. It is noted that user input or interaction is optional and not required in any case. Rather, the dataset may improve automatically. The user may still do manual improvements.

As soon as a new training has finished, the project owner is notified, and he can compare the latest results with the current AI model. In the latest model any reflection issue may be resolved. The owner then decides to publish the new model. The inspection workflow may be automatically updated and the performance on sunny days is further improved. The method according to the invention is not limited to the example described above, as the use-case description shall serve only for explanation purpose.

Any terms, such as first, second, third, fourth, etc., used herein shall not be understood as any indication of sequence or absolute number, but should rather be understood as a mere designation of components for distinguishing one of the components from another one of the components.

While the invention herein disclosed has been described by means of specific embodiments and applications thereof, numerous modifications and variations could be made thereto by those skilled in the art without departing from the scope of the invention set forth in the claims.

What is claimed is:

1. A method of performing a process which uses artificial intelligence, the method comprising:
running, by a computing device, an application which is configured to perform at least one process which uses an artificial intelligence model for processing signals and defining at least one parameter set for performing the at least one process, wherein the at least one process receives the signals from at least one sensor and sensor-driven component and implements the artificial intelligence model for processing the signals received from the at least one sensor and the sensor-driven component;
running, by the computing device, a user-driven workflow engine which comprises multiple modules including at least a first module, a second module, a third module and a fourth module;
defining, by the first module, a context of the at least one process and generating corresponding context information wherein the defining of the context of the at least one process includes generating the corresponding context information by the first module using information while executing the at least one process and/or executing information from the at least one sensor;
executing, by the third module of the user-driven workflow engine, a data collection workflow, wherein the third module, when executing the data collection workflow, requests user input from a user and guides the user through a user-driven data collection procedure of collecting labeled data and creates a dataset of labeled data as a basis for the at least one process, wherein the labeled data comprises data captured by the at least one sensor and a description of the data that is captured in a format which can be further processed by a machine, and creating and training, by the fourth module of the user-driven workflow engine, the artificial intelligence model based on the dataset of labeled data and the corresponding context information that is generated of the at least one process and providing the artificial intelligence model by the fourth module to the second module; and
using, by the second module, the artificial intelligence model in a user-driven workflow within the application while executing the at least one process.

2. The method according to claim 1, wherein the user-driven workflow by the second module implements a verification engine which is configured to verify one or more conditions by the user input that is received while executing the at least one process.

3. The method according to claim 1, wherein defining the context of the at least one process comprises:
defining context information, from the user input that is received, by the first module.

4. The method according to claim 3, wherein said defining the context information from the user input that is received comprises providing a wizard, by the first module, for receiving the user input and for the defining the context information by the user input that is received.

5. The method according to claim 1, wherein said defining the context of the at least one process comprises at least one of:
defining a context of a real environment in which the at least one process is applied,
defining an environment condition of the real environment in which the at least one process is applied,
defining a context of an object to which the at least one process is applied,
defining one or more parameters of object perception by the at least one process.

6. The method according to claim 1, wherein executing, by the third module, the data collection workflow comprises executing a workflow driven by the third module to stepwise collect the labeled data by received user input.

7. The method according to claim 6, wherein in the data collection workflow executed by the third module the user is inquired to gather different types of data from a plurality of different types of data available to the third module.

8. The method according to claim 6, wherein, while executing the data collection workflow executed by the third module, collected data is automatically labeled and/or synchronized with a server computer.

9. The method according to claim 1, wherein training the artificial intelligence model is initiated, by the fourth module, when a predefined amount of labeled data has been collected.

10. The method according to claim 1, wherein based on the corresponding context information of the at least one process, one of multiple different artificial intelligence technologies is selected and used by the fourth module to create the artificial intelligence model.

11. The method according to claim 1, wherein at least one of
- defining the context of the at least one process and generating the corresponding context information,
- executing the data collection workflow, and
- creating and training the artificial intelligence model, includes at least one iterative loop with an iterative modification of the at least one parameter while executing the at least one process.

12. The method according to claim 11, further comprising one or more of, wherein
- the executing the data collection workflow includes at least one of an iterative modification of a quality of the dataset and use of inference images in at least one iterative loop to increase the dataset,
- the creating and the training the artificial intelligence model includes using context for artificial intelligence model improvement,
- the creating and the training the artificial intelligence model comprises providing a training result interface for the user providing information for evaluating results and working against weaknesses.

13. A non-transitory computer readable medium comprising software code sections which are adapted to perform a method of performing a process which uses artificial intelligence when loaded into an internal memory of a computing device, the method comprising:

running, by the computing device, an application which is configured to perform at least one process which uses an artificial intelligence model for processing signals and defining at least one parameter set for performing the at least one process, wherein the at least one process receives the signals from at least one sensor and sensor-driven component and implements the artificial intelligence model for processing the signals received from the at least one sensor and the sensor-driven component;

running, by the computing device, a user-driven workflow engine which comprises multiple modules including at least a first module, a second module, a third module and a fourth module;

defining, by the first module, a context of the at least one process and generating corresponding context information wherein the defining of the context of the at least one process includes generating the corresponding context information by the first module using information while executing the at least one process and/or executing information from the at least one sensor;

executing, by the third module of the user-driven workflow engine, a data collection workflow, wherein the third module, when executing the data collection workflow, requests user input from a user and guides the user through a user-driven data collection procedure of collecting labeled data and creates a dataset of labeled data as a basis for the at least one process, wherein the labeled data comprises data captured by the at least one sensor and a description of the data that is captured in a format which can be further processed by a machine, and creating and training, by the fourth module of the user-driven workflow engine, the artificial intelligence model based on the dataset of labeled data and the corresponding context information that is generated of the at least one process and providing the artificial intelligence model by the fourth module to the second module; and using, by the second module, the artificial intelligence model in a user-driven workflow within the application while executing the at least one process.

\* \* \* \* \*